May 20, 1952  D. L. SISSLER  2,597,680
BOTTLE VIEWING MACHINE
Filed Feb. 6, 1950  2 SHEETS—SHEET 1
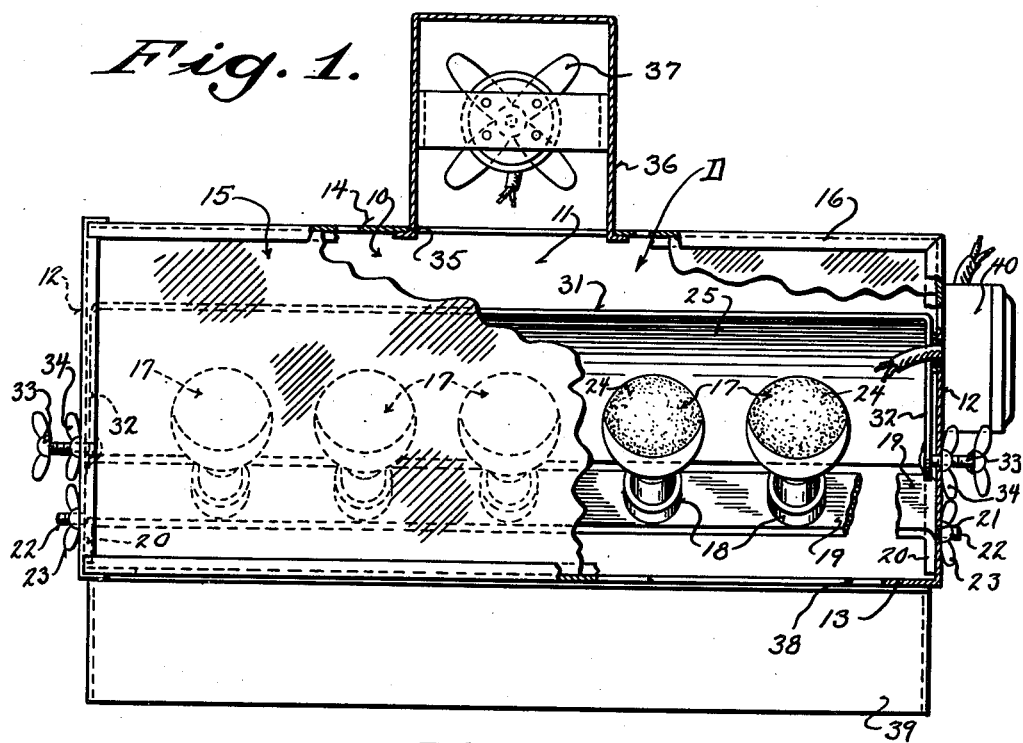
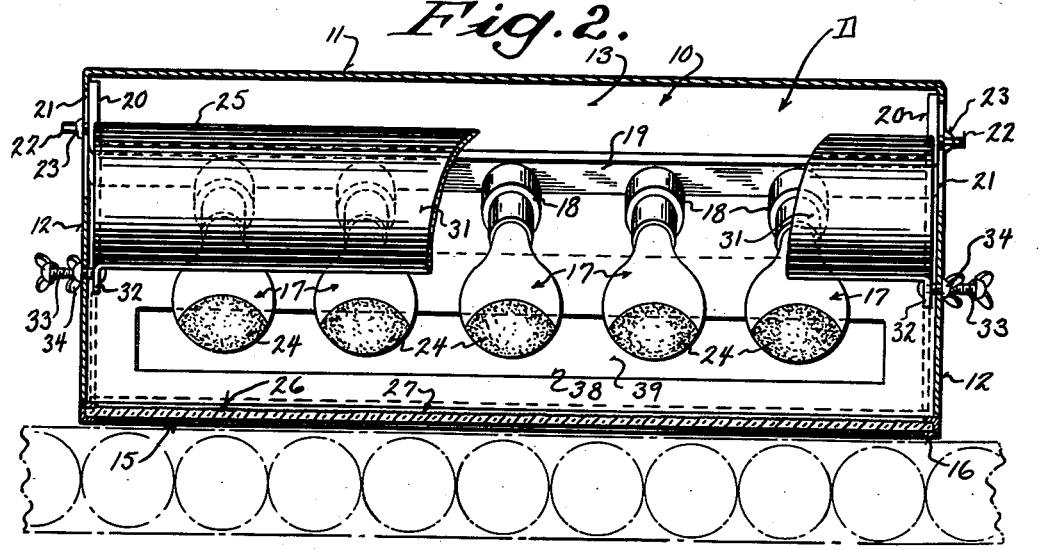
INVENTOR
DONALD L. SISSLER
BY
*Young & Wright*
ATTORNEYS May 20, 1952  D. L. SISSLER  2,597,680
BOTTLE VIEWING MACHINE
Filed Feb. 6, 1950  2 SHEETS—SHEET 2

INVENTOR
DONALD L. SISSLER

BY Young Wright

ATTORNEYS

Patented May 20, 1952

2,597,680

UNITED STATES PATENT OFFICE 2,597,680

BOTTLE VIEWING MACHINE

Donald L. Sissler, Oshkosh, Wis.

Application February 6, 1950, Serial No. 142,580

2 Claims. (Cl. 88—14)

This invention appertains to bottle inspection equipment and more particularly to a novel device for facilitating the inspecting of colored bottles, such as brown or green, without eye fatigue on the part of a constant observer.

It is of the utmost importance, in bottling plants, that the bottles and the contained beverage be in perfect condition and free from any foreign matter. Obviously, if any foreign matter is contained in a bottled beverage, a consumer resistance is immediately set up against that particular brand of beverage. It is now customary to pass the bottles in front of a bright viewing light or a casing containing a series of illuminating lamps. An observer, in front of the bottles and the source of light, views or inspects the passing bottles. Considerable eye strain takes place. Where colored bottles have to be inspected, the intensity of the light source must be materially increased to penetrate such bottles. This quickly results in eye strain for the observer and it is necessary to change observers at frequent intervals. Even where the light source is materially increased, the bottles are not correctly illuminated, particularly at their lower, thickened ends, directly at the point where foreign matter centers.

One of the primary objects of this invention is to provide means for permitting thorough illumination of colored bottles and to allow the bottles to be quickly inspected on the part of an observer without eye strain or fatigue.

Another salient object of the invention is to provide means whereby the intensity of the light can be increased for colored bottle inspection, with means whereby the light is diffused and objectionable rays eliminated, leaving only certain penetrating rays for the colored bottles which will not affect the eyes of an observer.

A further object of the invention is to provide a casing and a source of light of the desired intensity with a light diffusing (sand blasted) panel colored to agree with the color of the bottles being inspected, the panel functioning as a light filter, so that only the correct rays for inspection will leave the light casing and rays which will not hurt the eyes.

A further important object of the invention is to provide means for preventing direct glare from the electric bulbs being seen through the panel and for reflecting the light to the best advantage through the panel.

Another further important object of the invention is to provide means for adjusting the position of the lamps or bulbs and the reflector in the light casing to suit different sizes of bottles.

A still further object of the invention is to provide means for increasing the intensity of the filtered light at the bottom of the bottle and below normal eye level of the observer, so as to insure the proper inspection of the thick bottoms of bottles.

A still further object of the invention is to provide an efficient means for ventilating the casing so as to effectively carry away the heat generated by the bulbs.

A still further object of the invention is to provide a certain type of heat resistant glass for the panel to prevent cracking thereof by the intense heat generated by the bulbs and to provide coloring means for the panel which will not blister and peel from the panel by heat.

A still further object of the invention is to provide a device for inspecting bottles of the above character, which will be durable and efficient in use, one that will be simple and easy to manufacture, and one which can be placed upon the market at a reasonable cost.

With these and other objects in view, the invention consists in the novel construction, arrangement and formation of parts as will be hereinafter more specifically described and claimed, and illustrated in the accompanying drawings, in which drawings:

Figure 1 is a front elevational view of the improved bottle inspecting device, parts of the figure being shown broken away and in section to illustrate structural detail.

Figure 2 is a horizontal sectional view through the device taken on the line 2—2 of Figure 3, looking in the direction of the arrows.

Figure 3:
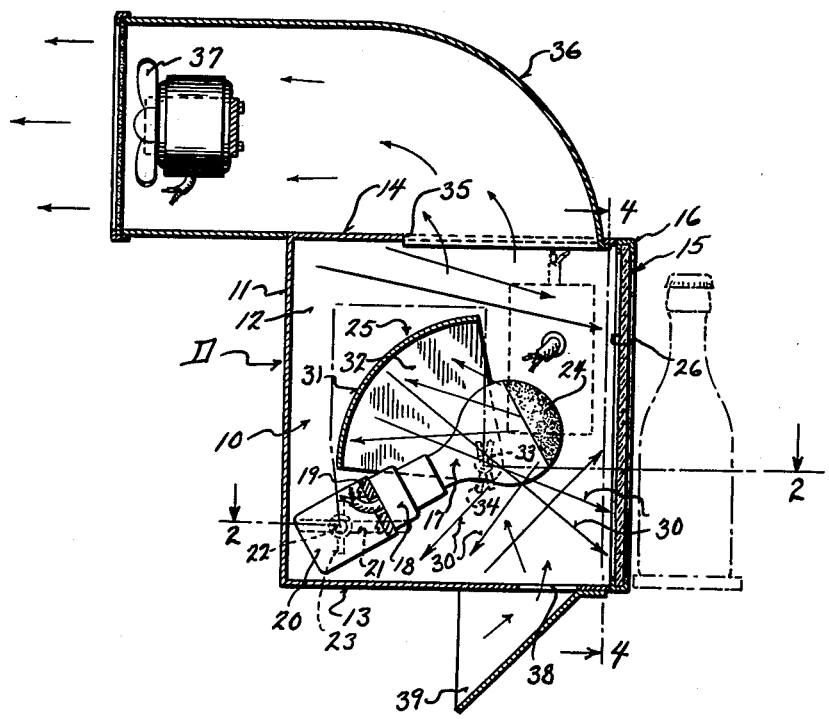
Figure 3 is a transverse sectional view through the device, illustrating the novel arrangement of the bank of electric bulbs and the reflector, the view also illustrating the novel generating means.

Referring to the drawings in detail, wherein similar reference characters designate corresponding parts throughout the several views, the letter D generally indicates the improved bottle inspection device and the same includes a casing 10. This casing 10 can include a rear wall 11, end walls 12, a bottom wall 13 and a top wall 14. The front of the casing is closed by a glass panel 15, which can be mounted in a supporting frame 16. The casing, itself, exclusive of the panel 15, is preferably made of sheet metal of the desired gage.

Mounted within the casing 10 is a bank of electric bulbs 17. The bulbs are preferably supported by porcelain lamp sockets 18 rigidly secured to a supporting plate 19. The plate 19 extends longitudinally of the casing. The terminals of the plate 19 are preferably bent down at right angles to provide feet 20 for engaging the end walls 12 of the casing. For a purpose, which will later appear, the plate is mounted in such a way that the angle of the bulbs 17 can be changed and the entire bank of lamps adjusted relative to the panel 15. As shown, the end walls 12 are provided with horizontally disposed slots 21, which receive studs 22, carried by the feet 20. Thumb nuts 23 are threaded on the studs into binding contact with the outer faces of the end walls 12. Obviously, by loosening the thumb nuts the bank of lamps can be swung up and down or moved bodily toward and away from the panel.

The bulbs 17 are of a special character and due to the use thereof the same are of a high light intensity and in order to avoid direct glare of the bulbs through the panel the outer surfaces thereof at their front ends can be coated with reflecting material as at 24. Not only does the coating of the bulbs prevent direct glare but the coating also reflects the light back inside of the casing where the same is thrown forwardly through the panel. This is also aided by a stainless steel reflector 25, which will also later be more fully described. If preferred, the lamps or bulbs 17, in lieu of being coated on the outside can be of the type which are coated inside with white and this also functions to diffuse the light.

Now, referring more particularly to the panel 15, which forms an important part of the invention, the same is made from heat resistant or oven glass commonly known as "Pyrex." This is important in that the bulbs 17 generate an intense heat and the oven glass will resist such heat and will not crack. In order to diffuse the light emanating from the bulbs 17, the inner surface of the panel is sand blasted or etched as at 26. This etched face 26 is then coated or sprayed a selected coloring, as at 27. The color corresponds to the color of the bottles being inspected. Thus, if the bottles are of a brown or amber color, the coating is of the same color. If the bottles to be inspected are green, then the coating is of a green color. In coating the inner etched face of the glass panel, the following procedure has been found advisable to prevent blistering and cracking of the coating under the intense heat from the bulbs; first the entire inner etched face of the panel is lightly sprayed with the selected color, after which the lower part of the panel, say the bottom 4" thereof, is shielded off and the upper or remaining part of the transparent Pyrex is sprayed heavily with a series of coats. The heavy coats are indicated by the reference character 28 and the light coat at the bottom of the panel is indicated by the reference character 29. It is to be understood that with this process, the colored material applied to the sand blasted surface creates millions of prisms and is absolutely essential to the construction of this inspection device, because the rays coming from the stainless steel reflector 25, penetrate through the transparent panel in millions of angles, and at the same time it filters out all of the colors except for instance, amber, and consequently, the only color showing on the front of this light is of high intensity predominent with amber which penetrates through the amber colored bottles with great ease. At the same time, this panel or filter cuts down the intensity of the white light which is produced inside to a point where it is not blinding to the operator and at the same time has sufficient force to penetrate with ease the amber colored bottles which pass in front of it when the light is operating. If the panel was simply sprayed without being etched or sand blasted, the results at the front of the light would be altogether different as the light would reflect directly through the transparent panel and lose much of its effect necessary to accomplish the particular job for which it is intended. In other words, the sand blasting and the treating of the panel with the selected coloring matter, effectively accomplishes the purpose intended. The bottom of the panel with the single coat 29, allows a greater amount of light to pass through the bottom of the bottles which are normally of a heavier glass and thus the bottoms of the bottles can be as easily inspected as the body portions thereof. As this light passing through the bottom of the panel is normally below the eye level of the observer, the eyes of the observer are not injured, and by referring to Figure 3, it can be seen that the major portion of the rays of light (see arrows indicated by the reference character 30) are directed down toward the floor or ground.

Attention is now directed to the fact that the bulbs or lamps 17 are at an acute angle to the horizontal, preferably about thirty degrees. This position is important as we have discovered that this upward tilt and the coated bulbs are directed toward the stainless steel reflector 25 and the reflector reflects the rays downward through the lightly coated lower portion of the panel, as heretofore explained, and consequently, a much greater light results in this position, making the bottom of the bottles quite visible.

As intimated, the stainless steel reflector 25 forms an important feature of the invention, and the same includes an arcuate shaped body portion 31, which extends in back of and slightly over the bulbs. The reflector is also mounted for adjustment and as shown the reflector carries end walls 32. These walls in turn carry studs 33, which extend through the openings in the end walls 12 of the casing. Threaded on the studs 33 are winged nuts 34 and by tightening these nuts against the walls 12, the reflector can be held in a desired, selected position.

The adjustment of the lamps and the reflector is important, as the position thereof must be changed in accordance with the size of the bottles being viewed, i. e., steins, 12 oz. bottles, quart bottles, etc.

Due to the intense heat generated, it is necessary to provide an efficient means for carrying the heat out of the casing and to create a draft past the lamps or bulbs 17. This is accomplished by forming an outlet 35 in the top wall 14 of the casing and providing a hood 36 communicating with the casing, through this opening. The hood extends rearwardly and has mounted therein an electrically driven fan 37. The lower wall 13 of the casing is provided with a longitudinally extending slot 38 and a shield 39 is carried by the lower wall 13 at the front edge of the slot. Obviously, when the fan 37 is operated, air will be drawn into the casing through the slot 38 past the bulbs and out through the hood 36.

Figures 4, 5, 6:
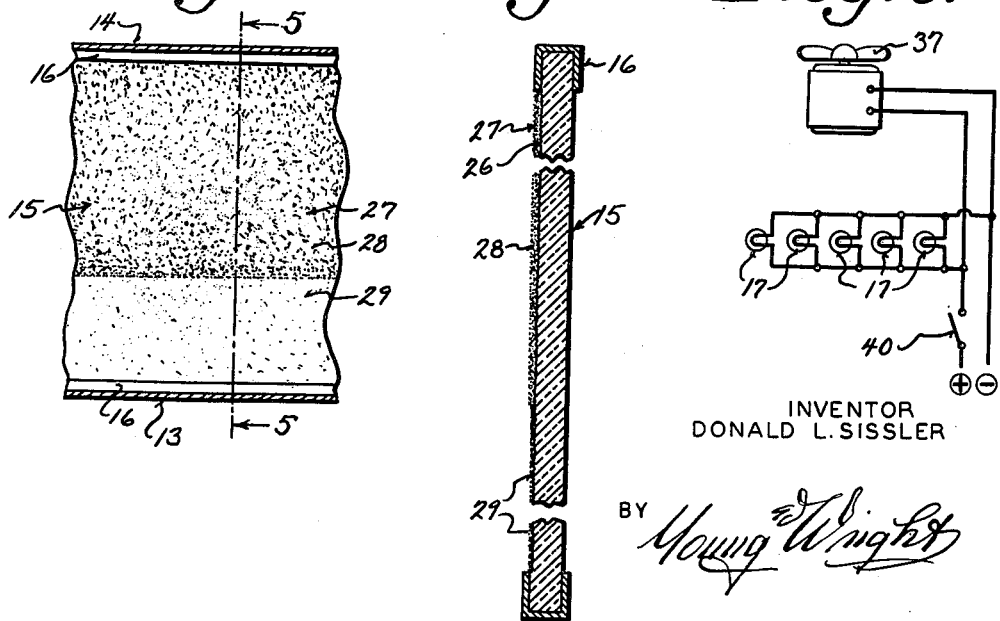
Figure 4 is a detail fragmentary sectional view taken on the line 4—4 of Figure 3, looking in the direction of the arrows and illustrating the novel panel.
Figure 5 is an enlarged detail transverse sectional view through the panel taken on the line 5—5 of Figure 4, looking in the direction of the arrows.
Figure 6 is a diagrammatic view illustrating one form of wiring for the bank of electric bulbs and the motor for the ventilating fan.

A switch 40 of a special type can be employed for the bulbs 17 and the fan 37. In Figure 6, a conventional switch 40 has been shown diagrammatically and the lamps 17 are arranged in parallel.

From the foregoing description, it can be seen that I have provided an exceptionally simple form of bottle inspecting device in which the light can be focused by an adjustable reflector 25, through a front panel in a downward path and in a downward path through the bottom of bottles being inspected. The entire inner surface of the casing can be painted white or with a reflecting material, and, this entire surface constitutes means for reflecting back the light from the bulbs through the panel.

Various changes in details may be made without departing from the spirit or the scope of this invention, but what I claim as new is:

1. A device for inspecting colored bottles comprising a casing having top, bottom, back and end walls, each of said end walls having a horizontally disposed slot adjacent its lower end, a transparent panel carried by the front of the casing, said panel having its inner face etched and coated with a colored substance corresponding to the color of bottles passing in front of the panel, said colored substance being of a less thickness at the lower end of the panel than on the major portion of the panel, a plate extending longitudinally of the casing in rear of the panel and having downwardly projecting feet for engaging the end walls of the casing adjacent said slots, said feet being provided with studs extending transversely therefrom and adapted to pass through said horizontally disposed slots, so that the plate can be moved back and forth and tilted on the studs, means on said studs engaging the end walls for holding the studs and plate in a selected adjusted position, a bank of electric lamps secured to said plate whereby the bank of lamps may be angularly adjustable and moved toward and away from said panel, a reflector mounted in said casing rearwardly of said lamps and extending longitudinally thereof, said reflector being of an arcuate shape in cross section and angularly adjustable, and a reflecting coating on the front of the lamps to direct the rays of light rearwardly whereby said bank of lamps and said reflector, both being adjustable, direct the majority of the rays of light from the lamps in a downward path through that portion of the panel having a less thickness of coating and through the bottom portion of the bottles passing in front of the panel.

2. An illuminating apparatus for use in inspecting beverages in colored bottles moving in succession along a horizontal conveyor comprising a casing having top, bottom, back and end walls, a light transmitting front panel in the casing on the side adjacent the conveyor, said panel being provided with a translucent coating thereon of a color that transmits rays of wave length range transmissible by the glass of the bottles and absorbs rays of other wave lengths, said coating comprising a transverse band of greater light transmissibility located adjacent the lower portion of the panel, each of said end walls having a horizontally disposed slot adjacent its lower end, a plate extending longitudinally of the casing in rear of said panel and having downwardly projecting end feet for engaging the end walls of the casing adjacent said slots, said feet being provided with threaded studs extending transversely therefrom and adapted to pass through said horizontally disposed slots, correspondingly threaded locking nuts for said studs adapted to move into binding contact with said end walls, a bank of electric lamps in the casing secured to said plate for movement therewith whereby the bank of lamps may be angularly adjustable and moved toward and away from said panel, a reflector mounted in said casing rearwardly of said lamps and extending longitudinally thereof, said reflector being of an arcuate shape in cross section and angularly adjustable, a reflecting coating on the front of said lamps to direct the rays of light rearwardly, said bank of lamps and said reflector being adjustable to direct the majority of the rays of the light from the lamps in a downward path through the band at the lower portion of the panel and through the bottom portion of the bottles on the conveyor.

DONALD L. SISSLER.

REFERENCES CITED

The following references are of record in the file of this patent:

UNITED STATES PATENTS

| Number | Name | Date |
|---|---|---|
| 988,710 | Holbrook | Apr. 4, 1911 |
| 1,805,969 | Bolstrom | May 19, 1931 |
| 2,051,946 | Hewlett | Aug. 25, 1936 |
| 2,174,848 | Stahmer | Oct. 3, 1939 |
| 2,219,572 | Everett | Oct. 29, 1940 |
| 2,259,394 | Sachtleben | Oct. 14, 1941 |
| 2,368,350 | Ellison | Jan. 30, 1945 |